March 22, 1927.

J. V. LAUGHLAND 1,621,513

WHEEL ATTACHMENT

Filed Feb. 9, 1926    2 Sheets-Sheet 1

JAMES VINT LAUGHLAND.
INVENTOR.

BY  Marks & Clerk
ATTORNEYS.

March 22, 1927.

J. V. LAUGHLAND 1,621,513

WHEEL ATTACHMENT

Filed Feb. 9, 1926

2 Sheets-Sheet 2

JAMES VINT LAUGHLAND.
INVENTOR.

BY Marks & Clerk

ATTORNEYS.

Patented Mar. 22, 1927.

1,621,513

UNITED STATES PATENT OFFICE.

JAMES VINT LAUGHLAND, OF RICHMOND, ONTARIO, CANADA.

WHEEL ATTACHMENT.

Application filed February 9, 1926. Serial No. 87,149.

This invention relates to attachments for the driving wheels of self propelled vehicles, the attachments being more particularly applicable to the wheels of motor cars.

The invention has for its object to provide an attachment which may be readily attached to the driving wheels of an existing vehicle and which in case of emergency, such as when entering deep snow or mud, will be automatically displaced to increase the tractive effect of the driving wheels and also prevent or reduce risk of skidding.

According to the invention a series of traction assisting members which normally present a substantially circular outer surface are pivotally mounted and so shaped and arranged that pivotal movement of any one of the members automatically causes a similar movement of all the other members, whereupon the members present a serrated outer surface which reduces the slipping of the driving wheels.

The invention consists in the arrangement and combination of parts described hereinafter and more particularly pointed out in the appended claims.

Referring now to the accompanying drawings which illustrate, by way of example, one convenient embodiment of the invention:—

Figure 1:
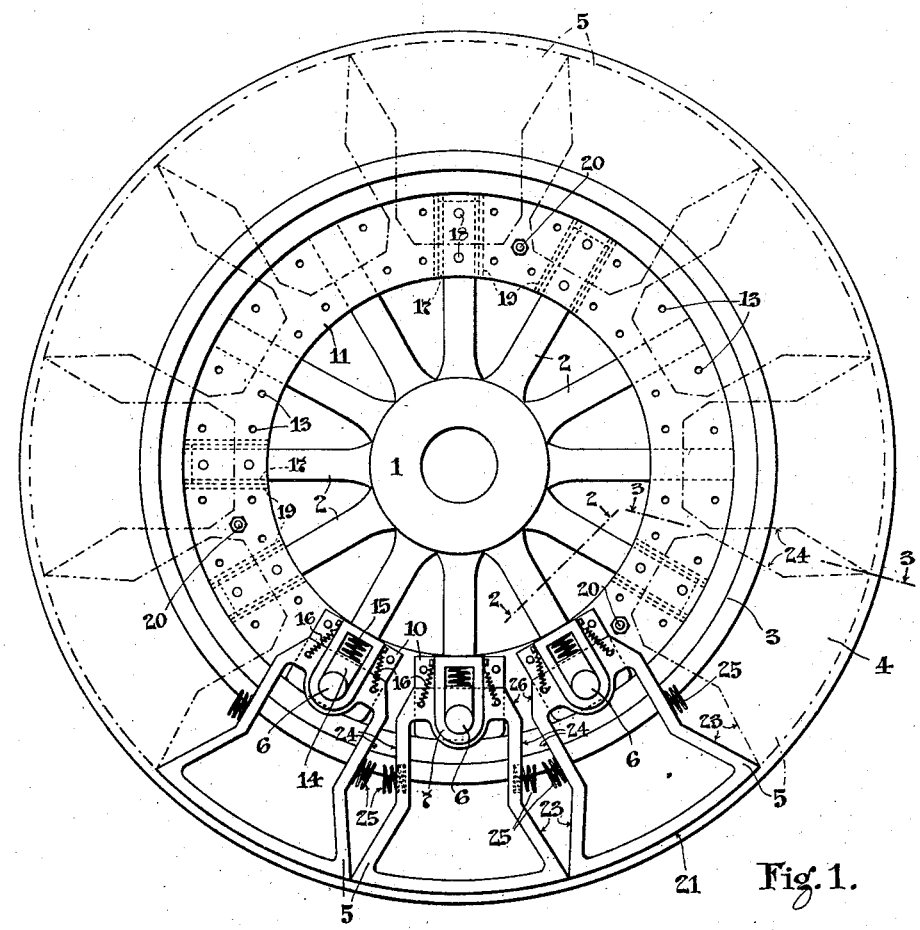
Figure 2:
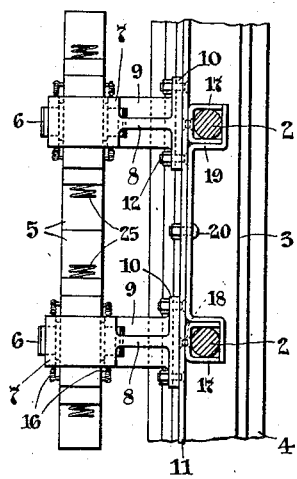
Figure 6:
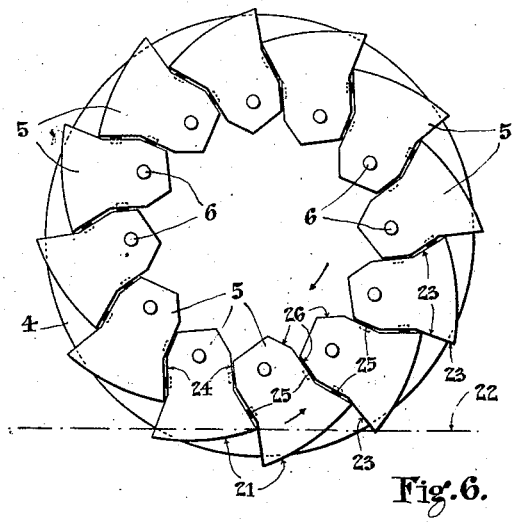
Figure 5:
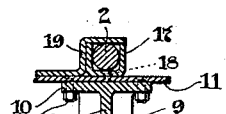
Figure 3:
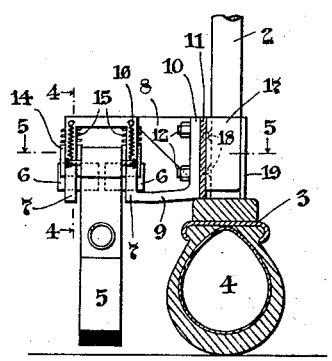
Figure 4:
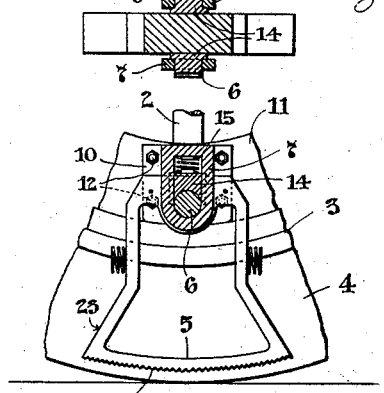

Figure 1 is a side elevation with certain portions indicated in chain dotted lines so as to expose other portions, Figure 2 is a section substantially on the line 2—2 of Figure 1, Figure 3 is a section on line 3—3 of Figure 1, Figure 4 is a section on line 4—4 of Figure 3, Figure 5 is a section on line 5—5 of Figure 3, and Figure 6 is a diagrammatic side elevation indicating the parts in their active position.

In the drawings the attachment is shown applied to an automobile wheel comprising a hub 1, spokes 2, rim 3 and tire 4. The invention comprises a plurality of members 5 which will be hereinafter referred to as feet. There are preferably the same number of feet 5 as there are spokes in the wheel, and as all the feet and their mountings are of the same construction, a description of one will apply to them all.

Each foot 5 has formed thereon or screwed thereinto a pair of trunnions 6, one on each side of the foot. The trunnions 6 are mounted in slots in the walls 7 of a bracket. The inner wall 7 is connected by a web 8 and a substantially horizontal portion 9 to a flat vertical part 10. The vertical part 10 of the foot supporting bracket is secured to a ring 11 by means of bolts 12 which extend through holes in the parts 10 and through holes 13 in the ring 11, see Figure 1, or the brackets may be formed integrally with the ring 11 or permanently riveted thereto.

Resting on the trunnions 6 and vertically slidable with them are bearing blocks 14 and compression springs 15 are interposed between the blocks 14 and the inner ends of the slots in which the blocks are mounted.

Relatively light tension springs 16 connect each foot on either side to its supporting bracket, and these springs 16 therefore tend to maintain the feet in the normal positions as indicated in Figure 1.

The means illustrated for attaching the ring 11 to the automobile wheel comprise radially disposed channels 17 which are secured to the ring, for example by rivets 18. A channel 17 may, if desired, be provided for each spoke 2, but in Figure 1 only three pairs of channels are shown, these pairs of channels being arranged to engage pairs of adjoining spokes at equal angular intervals round the wheel. Angular bars 19 are adapted at their ends to close the open sides of the channels 17 and at middle portions to be secured to the ring 11 as by means of bolts 20, see particularly Figure 2.

It will be noticed from Figure 1 that the outermost surfaces of the feet are of arcuate shape, the centre of the arc being designed to be substantially coincident with the centre of the wheel to which the invention is to be attached. The attachment is so designed that when the automobile is travelling on hard ground (as in Figures 1 to 5) the outermost surface of the feet form a continuous cylindrical surface 21 which, at its lowermost point, is spaced a short distance from the ground. As soon as the automobile wheels enter into deep snow or mud, the level of which is indicated by line 22 in Figure 6, the tire 4 slips, but the lowermost feet 5 are retarded and thereby caused to swing on their trunnions 6 in the opposite direction to the wheel, (see arrows in Figure 6). The feet are formed with outwardly diverging surfaces 23 and parallel surfaces 24, the latter having secured to them cushioning means such as compression springs 25. When the lowermost foot is caused to swing by engagement with the snow or mud, the leading edge or toe of each foot rides up the adjacent inclined surface 23 of the foot in front of it and consequently all the feet are caused to swing simultaneously on their respective trunnions into the position indicated in Figure 6.

The rear inclined surfaces 23 of the feet are then in a substantially radial position and are able to engage the snow or mud and thereby prevent slipping or skidding of the automobile wheel. By the time the lowermost foot has moved back out of the snow or mud the next foot in advance of it has entered the snow and the entire series of foot units are therefore maintained in the displaced positions as in Figure 6 until the automobile has moved forward out of the deep snow and is again on a hard road surface. If the wheels enter into very deep snow or mud a larger number of feet may be submerged at the same time and thus a greater number of radial surfaces 23 will be in engagement with the snow to increase the traction of the automobile driving wheels and prevent skidding and slipping. The rocking of the feet 5 on their trunnions 6 is limited and cushioned by the springs 25 since, towards the end of the swinging movement, the one spring 25 of each foot is compressed by coming into engagement with an inclined surface 26 of one adjacent foot, while the other spring 25 of each foot is compressed by entering into contact with the adjacent inclined surface 23 of the other adjoining foot. As the snow or mud becomes less deep the tension springs 16 will pull the feet back towards their normal position, and when the automobile again enters onto a hard surface the normal positions of the feet will be re-established as shown in Figure 1. The springs 16 are preferably only just strong enough to hold the feet in their normal radial position and do not offer any very great resistance to rocking of the feet as soon as they are engaged by the snow or soft ground. It will be understood that movement back to normal position will be assisted by centrifugal action. The arcuate surfaces 21 of the feet may be formed with transverse serrations, if desired, as illustrated in Figure 4 to facilitate the commencement of the rocking of the feet as soon as the feet touch the snow or mud.

If the automobile is travelling in a reverse direction the emergency feet can come into action in a manner similar to that already described, but in that event, of course, the lowermost foot will swing to the left in Figure 6 and all the other feet will move in the opposite direction to that shown.

Should the wheel pass over a stone or other irregularity while travelling on the road surface, the feet may ride over the stone by rising and causing the trunnions 6 and bearing blocks 14 to slide up in their slots against the action of the springs 15. A certain amount of lateral play may also be permitted between the feet and the bearing blocks 14 so as to permit the feet to yield to some extent laterally, if they encounter a side blow or thrust, or if the automobile should tend to slip sideways.

It will be seen that all the feet are pivotally mounted on the ring 11 and the entire attachment may be removed from the wheel by merely removing the nuts from the bolts 20.

The feet may be made hollow as shown in the drawings to reduce their weight.

It will be understood that many modifications of the shape of the feet, the manner of mounting the feet on the wheel and the form of spring means may be resorted to without departing from the spirit of the invention as defined in the appended claims.

In the claims the term "automobile" means any self propelled vehicle.

What I claim is:—

1. An attachment for automobile wheels comprising a series of members normally cooperating to present a substantially continuous circular outer surface, and means for pivotally mounting each of said members, each member having inclined surfaces over which may slide a part of the adjacent member to cause a simultaneous rocking movement of all the members on their respective pivots.

2. An attachment for automobile wheels comprising an annular plate, a series of brackets on one side of said plate, and a series of members having outward divergent surfaces pivotally mounted on said brackets, each member contacting with the adjacent members so that a pivotal movement of any one member causes a similar pivotal movement of all the members.

3. An attachment as claimed in claim 1, wherein means are provided for limiting and cushioning the pivotal movement of said members.

4. An attachment as claimed in claim 2, wherein means are provided for limiting and cushioning the pivotal movement of said members, said cushioning means comprising compression springs carried by said members and each adapted to engage and be compressed by the adjacent member towards the end of its pivotal movement.

5. An attachment as claimed in claim 2, wherein said members are provided with horizontal laterally projecting trunnions mounted slidably in radial slots in said brackets, springs being provided to maintain said trunnions normally at the outer ends of said slots.

6. An attachment as claimed in claim 2, wherein are provided radial channels on said annular plates on the side remote from the brackets, said channels being positioned to embrace the spokes of the wheels to which the attachment is applicable, angular plates coacting with said channels to embrace the spokes and means for detachably connecting said angular plate to the annular plate.

In testimony whereof I affix my signature.

JAMES VINT LAUGHLAND.